March 19, 1929.   E. E. LINDSEY   1,705,822
APPARATUS FOR TREATING SEMI-SOLIDS AND LIQUIDS
Filed Nov. 14, 1927
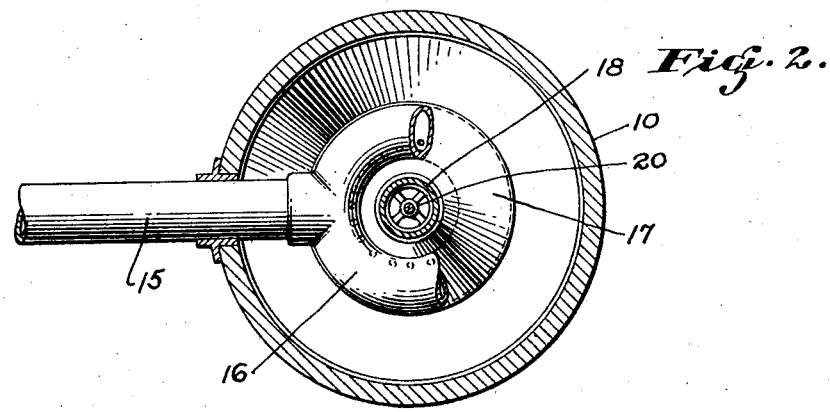
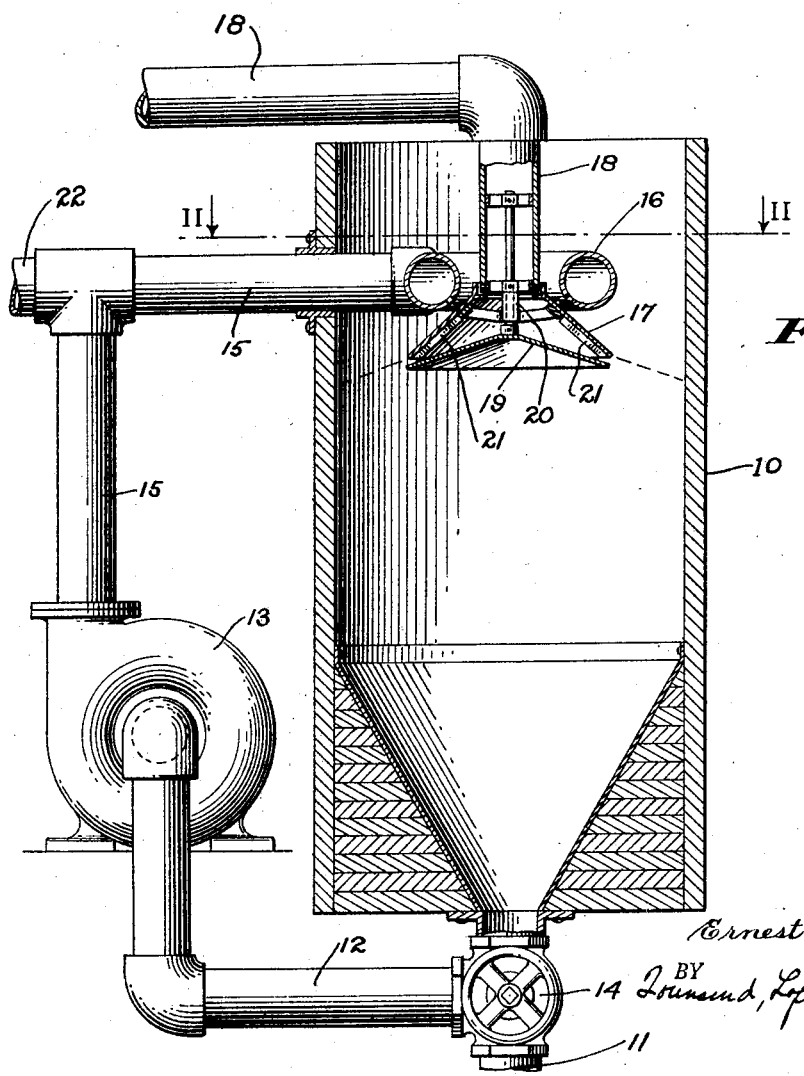
INVENTOR.
Ernest E. Lindsey.
BY
Townsend, Loftus & Hett
ATTORNEYS.

Patented Mar. 19, 1929.

1,705,822

UNITED STATES PATENT OFFICE.

ERNEST E. LINDSEY, OF SAN FRANCISCO, CALIFORNIA.

APPARATUS FOR TREATING SEMISOLIDS AND LIQUIDS.

Application filed November 14, 1927. Serial No. 232,959.

This invention relates to apparatus for converting various mixtures, especially semisolid mixtures of food ingredients, into a gelatinized form, and to condensing liquids such as milk.

In bakery operations it is advantageous to mix certain ingredients of food, such, for example, as are used in bread-making, and to subject them to a preliminary cooking or heating, in order to bring about gelatinization. This requires that the ingredients be thorougly mixed, and subjected to a temperature of approximately 200° Fahrenheit. Also, it is desirable to quickly cool the mixture after it has become gelatinized.

The present invention has for one of its objects the provision of a simple apparatus which is capable of quickly mixing and heating to gelatinized form large quantities of material, and thereafter and in the same vessel quickly cooling the same.

A further object of the invention is to provide an improved apparatus for condensing milk and the like.

One form which my invention may assume is exemplified in the following description and illustrated in the accompanying drawing, in which Fig. 1 shows a vertical, central, sectional view of the gelatinizer;

Fig. 2 shows a horizontal sectional view on the line II—II of Fig. 1.

The device as here shown comprises a tank 10, into which the materials to be mixed are introduced. This tank is open at its top, and has a conical bottom terminating in a spigot which connects with a discharge pipe 11 and a branch pipe 12, the latter leading to a pump 13. A valve 14 controls the connection through the pipes 11 and 12, whereby the material may be directed to the pump for circulation or may be drawn off from the tank for packing and storing.

In the pump 13 there is a pipe 15, leading to the top of the tank and terminating within the tank, preferably in the form of a ring 16 open at its lower side. Beneath the ring 16 is a conical spreader 17, onto which the material falls and is spread out so as to enter the tank in a thin sheet. This spreader 17 is preferably supported rotatably on a pipe 18, which is connected with a suitable source of air under pressure. Beneath the spreader 17 is a baffle or deflector 19, which is preferably supported on a rod 20 fixed within the pipe 18. This rod 20 may serve as a bearing for a spider 20ª which supports the spreader 17. This spreader 17 may be provided with inclined vanes 21 on its interior, so arranged that when air passes thereover the baffle is caused to rotate.

A heated gaseous fluid such as steam or hot air is admitted into the circulating system through a pipe 22.

In the operation of the device, the various ingredients entering into the mixture are placed in the tank 10 and the valve 14 is set so that when the pump is operated the mixture is withdrawn from the bottom of the tank and returned to the top thereof through the ring 16. At the same time, steam is admitted through the pipe 22 to raise the temperature of the mixture. Circulations and admission of steam continue until the mixture reaches the desired temperature of approximately 200° Fahrenheit, whereupon it assumes a gelatinized form. Then the admission of steam is cut off, and clean, cold air is admitted through the pipe 18 while the mixture is still being circulated.

The air or steam will be deflected out at the bottom over the baffle 19 and strike the mixture in a thin film or sheet.

The air emerging between baffle 19 and spreader 17 will come in contact with the vanes 21 and impart a turning movement to the spreader 17, thereby throwing the material from ring 16 outwardly in a thin sheet, exposing it advantageously to the action of the air.

Should it be desired to use this apparatus for condensing milk, the milk is circulated through the tank by pump 13, and hot air is admitted through pipe 18, so as to act on the milk, in the manner above described.

In this way the mixture can be quickly heated or cooled to the desired temperature.

Various changes in the construction and arrangement of the several parts may be employed without departing from the spirit of my invention, as disclosed in the appended claims.

Having thus described my invention, what I claim and desire to secure by Letters Patent is:

1. An apparatus for treating liquids and semi-solids, comprising a tank, means for circulating material to be treated through said tank, means for spreading material out in a thin sheet where it enters the tank, and means for directing a heated gaseous fluid into the material while it is spread out.

2. An apparatus for treating liquids and semi-solids, comprising a tank, means for circulating material to be treated through said tank, means for spreading material out in a thin sheet where it enters the tank, means for directing a heated gaseous fluid into the material while it is spread out, and means for imparting a turning motion to said spreading means.

3. An apparatus for treating liquids and semi-solids, comprising a tank, a pump having connections with the top and bottom of the tank for withdrawing the material from the bottom and returning it to the tank at the top thereof, a ring-shaped pipe open at its lower side, through which the material is discharged at the top of the tank, a conical spreader beneath the said ring-shaped pipe, and a supply pipe for a heated gaseous fluid connecting with the interior of the conical spreader.

4. An apparatus for treating liquids and semi-solids, comprising a tank, a pump having connections with the top and bottom of the tank for withdrawing the material from the bottom and returning it to the tank at the top thereof, a ring-shaped pipe open at its lower side, through which the material is discharged at the top of the tank, a conical spreader beneath the said ring-shaped pipe, a supply pipe for a heated gaseous fluid connecting with the interior of the conical spreader, and a baffle beneath the spreader for directing the gaseous fluid outwardly at the bottom of the spreader.

5. An apparatus for gelatinizing mixtures, comprising a tank, means for circulating the mixture through the tank, connections for admitting steam thereto during circulation, and means for admitting cold air to the circuit to cool the mixture after the same has been gelatinized.

ERNEST E. LINDSEY.